Aug. 28, 1923.
J. GOOD
1,466,647
CHARGE FORMING APPARATUS
Filed May 23, 1917
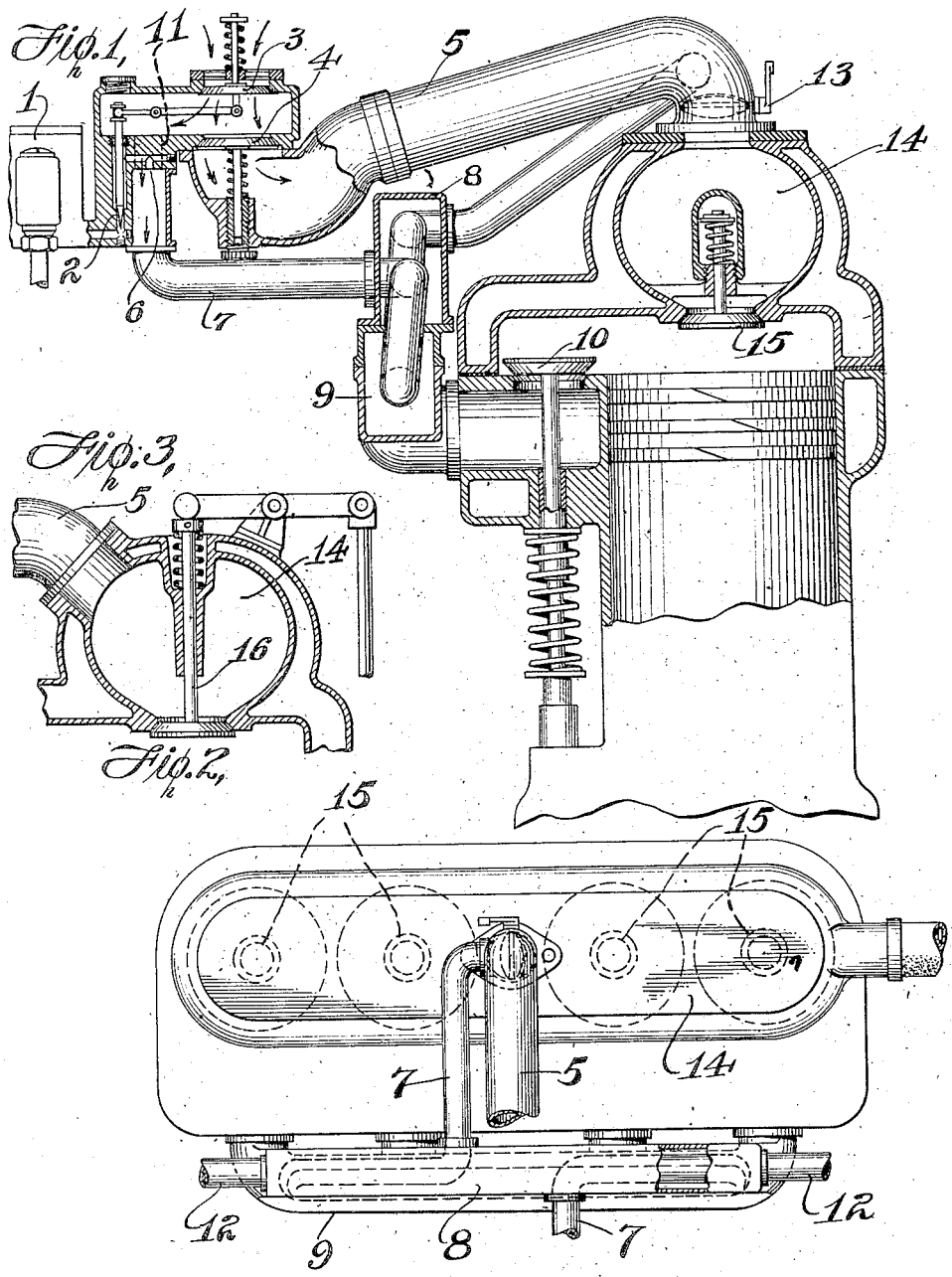

Patented Aug. 28, 1923.

1,466,647

UNITED STATES PATENT OFFICE.

JOHN GOOD, OF BROOKLYN, NEW YORK, ASSIGNOR TO GOOD INVENTIONS CO., OF NEW YORK, N. Y., A CORPORATION OF NEW YORK.

CHARGE-FORMING APPARATUS.

Application filed May 23, 1917. Serial No. 170,411.

*To all whom it may concern:*

Be it known that I, JOHN GOOD, United States citizen, residing in Brooklyn, New York, have invented the following described Improvements in Charge-Forming Apparatus.

The invention relates to internal combustion engines burning kerosene, heavy gasoline and fuels of like character and consists in a means of producing a fuel charge mixture in a condition specially suited for maximum volumetric efficiency and which may for convenience be termed a condition of fog, the liquid fuel being suspended in the air component of the engine charge in the form of microscopic globules or particles much finer than possible of attainment by mechanical atomization. The accompanying drawing illustrates one form of embodiment of the invention, Fig. 1 being a general cross-section through one engine cylinder and through the carburetor structure;

Fig. 2 being a top plan of the said engine on smaller scale; and

Fig. 3 a cross-sectional illustration of a modified form.

The liquid fuel, which may be assumed to be kerosene for purposes of description, enters the carburetor or charge-proportioning device from a float chamber 1, through a metering orifice 2, the metering pin whereof is actuated through lever connections as indicated, by the displacement of the main air inlet valve 3. By this means the fuel and air proportions of the charge are established and maintained constant for all conditions. The air flow through the valve 3 is induced by the suction of the engine and passes from said valve to a second valve 4 in the nature of a spring-loaded check valve, passing thence through a relatively large air pipe 5 to the intake space of the engine. The metered fuel liquid discharges through the delivery opening 6 into a pipe 7 which may be termed a vaporizing or a transfer pipe and which is enclosed partly within a heater box 8 and partly within the exhaust manifold 9 of the engine, close to the exhaust valves 10. Some of the air which has passed the entrance valve 3 also enters the transfer pipe through the dotted line opening marked 11 in Fig. 1. The heater box 8 is a pre-heater for the fuel and is adapted to receive flame or some heated medium through its pipe connection 12 from some suitable source and for the purpose of heating the transfer pipe when it is cold and the engine is to be set in operation. The exhaust manifold 9 supplies heat to the said transfer pipe when the engine is in normal operation and by such heat converts the liquid fuel therein into vaporous form richly impregnating the relatively small amount of air therein and producing a very hot vaporous mixture. This hot mixture is delivered by the pipe 7 to the main air pipe 5 just in advance of the engine throttle 13 and close to the intake space 14. The latter space is conveniently formed as part of the engine casting, as shown in the drawing and is jacketed and cooled by the same means as the engine cylinders and is much larger than the ordinary intake passage or manifold of gasoline or kerosene engines. That is to say it has a cubical capacity approximating the total piston displacement of the engine, the large volume serving to produce a diminishment of the flow velocity through it as compared to the velocity in the pipes 5 and 7. The said intake space is elongated and common to the row of engine cylinders in a multi-cylinder engine and is close to the combustion spaces thereof so that it has direct and immediate delivery thereinto through the inlet valves 15. In Fig. 1 the inlet valve is suction-operated or a so-called automatic valve. In Fig. 3, which shows the same type and arrangement of intake space, the valve 16 is mechanically operated by a common arrangement of push-rod and rocker arm gearing.

The contact of the hot, rich vapor or vapor-air mixture from the transfer pipe with the relatively cooler air in the air pipe 5, results in the condensation of the vapor from the relative chilling and the production of an exceedingly fine and dust-like fog which fills the large intake space and enters the engine combustion spaces in the same condition. The temperature maintained in the jacketed intake space 14 may assist in the chilling effect and promote the fog formation, depending upon the temperature of the entering charge or charge mixture and the low temperature also avoids undue thermal expansion from the previous application of heat and may even result in appreciable densification of the charge. The condition of fog is preserved by the large volume of the intake space which avoids high velocity and such conditions as are likely to cause precipitation. The cross-section of the intake space is preferably circular or nearly so in order that it may present the minimum surface for collection, by impingement, of the fog particles but other shapes can of course be used depending upon the engine design. The passages or openings from the intake space 14 to the engine cylinders are in the lower part of said space in order that any solid liquid may be quickly drawn into the cylinders. The important features of the described construction are those which conduce to the production and preservation of the fog condition and it will therefore be apparent that the particular character of the carburetor proper, by which the fuel proportions are established and maintained, is relatively non-essential and that any suitable charge-forming or proportioning device may be used in place of the one shown. It is an incident of the operation of the check-valve 4 that for the idling speed practically all of the air component of the charge passes through the transfer pipe 7 to the large intake space to be there chilled by virtue of the relatively cooler temperature maintained therein, or if for any reason it is not chilled to its dew point, it may at least be reduced in temperature with corresponding increase of density and hence enhancement of its efficiency. The relative proportions of air passing through the transfer pipe and through the main air pipe are, however, subject to variation as conditions may require and may be varied in the carburetor shown in the drawings by adjustment of the spring of the valve 4, as will be obvious.

While I have shown my invention and explained the principle thereof in connection with the mechanical embodiment which is at present preferred it will be understood that various changes, omissions, substitutions, additions and reversals of parts and changes in proportion may be made within the scope of the appended claims.

Certain of the features of the apparatus herein shown are claimed in a co-pending application Serial No. 131,613, filed Nov. 16, 1916.

Claims:

1. A charge-forming apparatus for internal combustion engines, comprising a large intake space in close, valved communication with the combustion space of the engine, means for cooling said space and separate means for conducting heated vaporized liquid fuel and relatively cool air to said space in the proportions suited for explosive combustion in the engine.

2. A charge-forming apparatus for internal combustion engines, comprising a large intake space in valved communication with the combustion space of the engine, means for cooling said space, and separate means for conducting heated vaporized liquid fuel and relatively cool air to said space in proportions suited for explosive combustion in the engine, said intake space being of sufficient dimensions to produce diminished flow velocity of the fuel mixture therein.

3. A charge-forming apparatus for internal combustion engines comprising a relatively large water-jacketed intake space in close, valved communication with the combustion space of the engine, means for mixing heated fuel vapor and air at the entrance to said intake space and an engine throttle controlling the entrance of said mixture thereto.

4. A charge-forming apparatus for internal combustion engines comprising means for proportioning the liquid fuel and air components of the charge, means for conducting the air from said proportioning means to the engine, a transfer pipe for conducting the liquid fuel to the engine disposed in the exhaust gas passage thereof and a relatively large intake space wherein the air and fuel are converted into fog condition for admission to the combustion space of the engine.

5. A charge-forming apparatus for internal combustion engines comprising a relatively large engine intake space with the engine intake valves disposed in the lower part thereof and means for uniting a heated vaporized liquid fuel and air in said intake space to form a fog mixture therein for admission to the engine cylinders.

6. The combination in an internal combustion engine of a fog making engine intake space, a charge-forming device having separate pipes for air and fuel leading to said space and a single entrance valve and means for heating and pre-heating said fuel pipe.

7. In a kerosene burning engine, the combination with the engine intake manifold, of means for introducing therein a vaporized mixture of liquid fuel and air in a heated state, separate means for introducing air in an unheated state therein and means for predetermining the amount of the air introduced into said intake in proportion to the fuel introduced therein, said intake manifold being of sufficient dimensions to produce diminished flow velocity of the fuel mixture from the point of junction of said two fuel and air introducing means to the engine intake ports.

8. In an internal combustion engine, the combination with the engine intake passage, of means for separately introducing therein a stream of vaporized liquid fuel with air and a stream of air only and a single charge proportioning device through which all of said air flows to the said passage, said intake passage having a larger cross-sectional area than the intake ports of the engine.

9. In a kerosene burning engine, the combination with an externally cooled intake space, of means for introducing therein vaporized liquid fuel and air in a heated condition and air in an unheated condition.

10. In an internal combustion engine, the combination with the suction intake passage of the engine, means for proportioning liquid fuel and air and introducing all of the liquid and some of the air into said passage as a substantially dry gas, and the remainder of the air into said passage in a relatively cooler condition, the said passage having a larger cross sectional area than the intake ports of the engine and adapted thereby to minimize precipitation of liquid fuel therein.

11. In an engine of the class described, the combination of a plurality of inlet ports serving a plurality of cylinders of the engine and an enlarged intake header serving all said ports in immediate connection therewith through openings in the lower part of said header and means for creating a mixture of kerosene and air in said header to serve as the combustion charge in the engine.

12. For engines operated by the burning of liquid fuel, the combination of a storage intake space provided with a port for discharging therefrom a mixture of air and fuel, and means for delivering air and fuel to such space and for vaporizing the fuel prior to its admission to such space and introduction to all the air of the final mixture, the cross area of said intake space being greater than the available cross area of the discharge port therefrom.

13. For engines operated by the burning of liquid fuel, the combination of a storage intake space provided with a port for discharging therefrom a mixture of air and fuel, and means for delivering air and fuel to such space and for vaporizing the fuel prior to its admission to such space and introduction to all the air of the final mixture, the temperatures, and the fuel and the air delivered to the intake space, being so proportioned as to result in fog within the intake.

14. In an internal combustion engine, the combination of an intake manifold of a cubical capacity approximating the total piston displacement of the engine and means for delivering air and fuel to such manifold and for heating and vaporizing the fuel prior to its delivery to such manifold and introduction to all the air of the final mixture within the manifold.

15. In a multicylinder internal combustion engine, the combination of an intake manifold and a plurality of intake ports discharging therefrom to a plurality of cylinders, the cross area of the manifold being greater than the sum of the available cross areas of the said ports, and means for delivering air and fuel to such manifold and for heating and vaporizing the fuel prior to its delivery to such manifold and introduction to all the air of the final mixture within the manifold.

In testimony whereof, I have signed this specification.

JOHN GOOD.